US 7,517,011 B2

(12) United States Patent
Aliev (10) Patent No.: US 7,517,011 B2
(45) Date of Patent: Apr. 14, 2009

(54) COMBINATION CHILD CARRIER

(76) Inventor: Adil Aliyevich Aliev, 411 English Pl., Mamaroneck, NY (US) 10543

( * ) Notice: Subject to any disclaimer, the term of this patent is extended or adjusted under 35 U.S.C. 154(b) by 34 days.

(21) Appl. No.: 11/668,304

(22) Filed: Jan. 29, 2007

(65) Prior Publication Data
US 2008/0007097 A1 Jan. 10, 2008

Related U.S. Application Data

(60) Provisional application No. 60/817,120, filed on Jun. 28, 2006.

(51) Int. Cl.
*A47C 13/00* (2006.01)
(52) U.S. Cl. .................. 297/118; 297/130; 297/195.13; 224/161
(58) Field of Classification Search ................ 297/118, 297/130, 195.12, 195.13; 224/161
See application file for complete search history.

(56) References Cited

U.S. PATENT DOCUMENTS

| 3,659,865 | A |   | 5/1972  | Nothacker |
|-----------|---|---|---------|-----------|
| 4,786,064 | A | * | 11/1988 | Baghdasarian .......... 297/130 X |
| 4,915,401 | A |   | 4/1990  | Severson et al. |
| 5,071,146 | A |   | 12/1991 | Lewis et al. |
| 5,431,478 | A | * | 7/1995  | Noonan ....................... 297/130 |
| 6,155,579 | A | * | 12/2000 | Eyman et al. ................. 280/30 |
| 6,612,645 | B1 | * | 9/2003  | Hsu ....................... 297/195.13 |
| 2004/0173997 | A1 |   | 9/2004 | Voll |

* cited by examiner

*Primary Examiner*—Anthony D Barfield
(74) *Attorney, Agent, or Firm*—Advantia Law Group; Michael W. Starkweather; Jason P. Webb (57) ABSTRACT

A combination child carrier for carrying a child. There is: a first horizontal seat member; a first vertical support member, coupled to a rear portion the first horizontal seat member and extending upwardly therefrom; an extendable handle member, coupled to a top of the first vertical support member; a plurality of rear wheels, coupled near a rear portion the first horizontal seat member; and a front leg support member, hingedly coupled to a front portion of the first horizontal seat member and extending downwardly therefrom.

15 Claims, 8 Drawing Sheets

COMBINATION CHILD CARRIER

CROSS-REFERENCE TO RELATED APPLICATIONS

This invention claims priority, under 35 U.S.C. § 120, to the U.S. Provisional Patent Application No. 60/817,120 to Adil Aliyevich Aliev filed on 28 Jun. 2006, which is incorporated by reference herein.

BACKGROUND OF THE INVENTION

1. Field of the Invention

The present invention relates to child seats and carriers, specifically child safety seats which can be used as strollers, car seats, backpack carriers, child bicycle seats, and swings.

2. Description of the Related Art

It is important to safely secure children during transportation in order to prevent injury. Child seats and child carrying devices are often used to safely secure and transport children. Various forms of safety seats, child carrying devices, child transporting devices, and child restraining devices have been developed to protect children during transportation and to provide a safe and convenient way for transporting children in a car, on plane, on a bicycle, and while walking and/or hiking.

Many child seats and child carrying devices are multi-functional and function both as a child car seat as well as a child carrying device for transportation of a child when not in a car. Further, many child seats and child carrying devices often have removable parts and/or are collapsible for transformation into another child seat and/or carrying device.

For example, wheels and handles are often attached to child vehicle safety restraint devices for use as a stroller. Likewise, child vehicle safety restraint devices are often mounted on carriages for use as a stroller. Additionally, child seats and child carrying devices often function as backpack carrier. For example, many child seats and child carrying devices often have shoulder straps for carrying child seats and child carrying devices as a backpack carriers. More, many child seats and child carrying devices have compressible and/or extendable parts for transformation from one child carrying device to another, such as from a stroller to a backpack carrier.

However, there is a trade-off between structural rigidity and stability of a child seat and/or carrying device when it is used for one function and the weight of the device when it is used for another function. Furthermore, many child seats and/or child carrying devices do not have an all-in-one functionality, and may only be used for one or two of the above mentioned functions. Also, many child seats and/or child carrying devices have removable parts which may become lost and/or damaged when removed.

Some improvements have been made in the field. Examples include but are not limited to the references described below, which references are incorporated by reference herein:

U.S. Patent Application Publication No. 2004/0173997, by Voll, discloses an improved combination stroller, car seat, and carrier for infants comprising a pair of wheels and a handle mounted on a pair of collapsible tubular members mounted through a pair of spaced-apart openings in the outward extending lip rimming the uppermost portion of the back of the seat and anchored to a single axle secured to the rear underside portion of the seat. When the pair of collapsible tubular members are collapsed for use as a car seat for infants inside the motor vehicle, the handle and pair of collapsible tubular members are disposed in a stowed position against the seat back portion of the car seat. The bottom portion of the combination is adapted for disposition in lockable securement either directly to the seat belt safety system of a motor vehicle, such as a car or automobile, or the like, or via an interlocking tray mounted on a seating surface inside the motor vehicle and secured to the body or frame of the motor vehicle.

U.S. Pat. No. 3,569,865, issued to Nothacker, discloses a child's safety seat including a trough like shell with an upholstered interior and a safety padding spanning the width of the shell to be struck by the head of a child if he falls forward; fastening means on the base of the shell permit attachment to carrying straps and belts, transport wheels, sled runners and the like.

U.S. Pat. No. 5,431,478, issued to Noonan, discloses a convertible baby carrier having a clamshell figuration in which a first body portion and a second body portion are pivotally attached to each other, and includes apparatus for adjusting and fixing the angular relationship of the two body portions. The carrier includes detachable legs that are pivotally mounted to the body portions, and the apparatus is provided for fixing the angular positions of the legs relative to the body portions. The carrier can be converted to a seat, a stroller, a bed, a backpack, or the like by altering the angular relationships of the body portions and of the legs relative to the body portions.

U.S. Pat. No. 5,071,146, issued to Lewis et al., discloses a child infant stroller is provided which is convertible from an operative stroller position to a folded position adapted to be received by and secured on a conventional bicycle infant carrier. The stroller generally comprises a child or infant seat and a frame member supporting the infant seat. The frame member includes two pair of legs, on of which, preferably a front pair, is adapted to rotate and releasably engage with an upper portion of the frame member. The stroller can then be placed on the bicycle infant carrier and be secured by a belt included with the conventional bicycle infant carrier. A removable attachment may also be included which attaches the two pairs of legs together when the stroller is in its operative stroller position.

U.S. Pat. No. 4,915,401, issued to Severson et al., discloses a child carrier usable as a backpack and as a stroller. The carrier includes a frame having an upper and lower ends in a lengthwise axis extending between the ends. Front wheels are support by the lower end of the frame, and a child seat and backpack straps are connectable to the frame. Rear wheels are connected to the frame via a rear support assembly that includes sliders movable along the longitudinal axis of the frame, first members pivotally connected to the sliders, and second members pivotally connected to the first members and to the frame. The rear support assembly is movable to a first position in which the rear wheels are adjacent to the frame, for permitting use of the carrier as a backpack, and to a second position in which the rear wheels are positioned away from the frame, for use of the carrier as a stroller. The carrier further includes a handle pivotable between a collapsed position in which the handle is adjacent to the frame and an extended position in which the handle extends away from the frame. Movement of the handle and rear support assembly may be linked, to facilitate conversion of the carrier to the stroller configuration, and to provide a recliner configuration in which the carrier is supportable by the rear wheels and handle.

The inventions heretofore known suffer from a number of disadvantages, which include: not being universal; being incomplete; being inconvenient; not being adaptable; being expensive; being difficult to use; being complicated; not being compact; and/or being impractical.

What is needed is a combination child carrier that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available child support devices and child carriers. Accordingly, the present invention has been developed to provide a combination child carrier for carrying a child.

In one embodiment of the invention, there is a combination child carrier, including: a first horizontal seat member, configured to provide a seat for sitting; a first vertical support member, coupled to a rear portion the first horizontal seat member and/or extending upwardly therefrom, configured to provide back support; an extendable handle member, coupled to a top of the first vertical support member; and/or a plurality of rear wheels, coupled near a rear portion the first horizontal seat member. The combination child carrier also includes a front leg support member, hingedly coupled to a front portion of the first horizontal seat member and/or extending downwardly therefrom. In a first stored mode the rear wheels may extend above the first horizontal seat member in a substantially horizontal direction, and/or in a first transport mode the rear wheels may extend below the first horizontal seat member in a substantially vertical direction.

In another embodiment of the invention, the combination child carrier includes: a first front wheel, rotatably coupled to the first front leg support member; and/or a second front wheel, rotatably coupled to the second front leg support member. In still another embodiment of the invention, the combination child carrier includes a restraint mechanism, coupled to the first horizontal seat member, configured to restrain a child sitting in the combination child carrier. In yet another embodiment of the invention, the combination child carrier includes: a first top support member, coupled to a first side of the top of the first vertical support member, configured to support a head of a child sitting in the combination child carrier; and/or a second top support member, coupled to a second side of the top of the first vertical support member, configured to support a head of a child sitting in the combination child carrier.

In still yet another embodiment of the invention, the first horizontal seat member includes a pad member, which may be disposed over a top of the first horizontal seat member, configured to provide padding for a child sitting on the combination child carrier. In even another embodiment of the invention, the combination child carrier includes: a second vertical support member, hingedly coupled to a rear portion of the first horizontal seat member and/or extending upwardly therefrom, which may be disposed over a front of the first vertical support member, configured to provide back support; a second flexible seat member, coupled to and/or which may be disposed between the first vertical support member and/or the second vertical support member, configured to provide a seat for sitting. In a second stored mode the flexible seat member may be disposed substantially vertical, and/or in a second transport mode the flexible seat member may be disposed substantially horizontal. The combination child carrier additionally includes: a first vertical strap member, coupled to the first side of the first vertical support member, configured to provide a strap for a first shoulder; and/or a second vertical strap member, coupled to the second side of the first vertical support member, configured to provide a strap for a second shoulder.

In even still another embodiment of the invention, the combination child carrier includes: a horizontal strap member, coupled to the first side and the second side of the first vertical support member, configured to provide a strap for a waist. In even yet another embodiment of the invention, the combination child carrier includes: a first elongated bicycle connection member, removably coupled to a rear of the first vertical support member, coupleable to the first side of the first horizontal seat member, configured to connect the combination child carrier to a bicycle; a second elongated bicycle connection member, removably coupled to the rear of the first vertical support member, coupleable to the second side of the rear the first horizontal seat member, configured to connect the combination child carrier to a bicycle; and/or a front elongated bicycle connection member, coupled to the front portion of the first horizontal seat member, configured to connect the combination child carrier to a bicycle. In even still yet another embodiment of the invention, the first elongated bicycle connection member and/or the second elongated bicycle connection member may be removably coupled to the rear of the first vertical support member by snapping; and/or the first elongated bicycle connection member and/or the second elongated bicycle connection member may be coupleable to the first side of the first horizontal seat member and/or the second side of the first horizontal seat member, respectively, by bolting.

In an additional embodiment of the invention, the combination child carrier includes: a hardware storage container, coupled to a bottom of the first horizontal seat member, configured to provide storage of hardware for coupling the combination child carrier to a bicycle. In still an additional embodiment of the invention, the combination child carrier includes a first elongated bicycle connection member, removably coupled to a rear of the first vertical support member, coupleable to the first side of the first horizontal seat member, configured to connect the combination child carrier to a bicycle; a second elongated bicycle connection member, removably coupled to the rear of the first vertical support member, coupleable to the second side of the rear the first horizontal seat member, configured to connect the combination child carrier to a bicycle; and/or a front elongated bicycle connection member, coupled to the front portion of the first horizontal seat member, configured to connect the combination child carrier to a bicycle.

In yet an additional embodiment of the invention, the first elongated bicycle connection member and/or the second elongated bicycle connection member may be removably coupled to the rear of the first vertical support member by snapping; and/or the first elongated bicycle connection member and/or the second elongated bicycle connection member may be coupleable to the first side of the first horizontal seat member and/or the second side of the first horizontal seat member, respectively, by bolting. In still yet an additional embodiment of the invention, the combination child carrier includes a hardware storage container, coupled to a bottom of the first horizontal seat member, configured to provide storage of hardware for coupling the combination child carrier to a bicycle.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). Understanding that these drawing(s) depict only typical embodiments of the invention and are not therefore to be considered to be limiting of its scope, the invention will be described and explained with additional specificity and detail through the use of the accompanying drawing(s), in which.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 1:
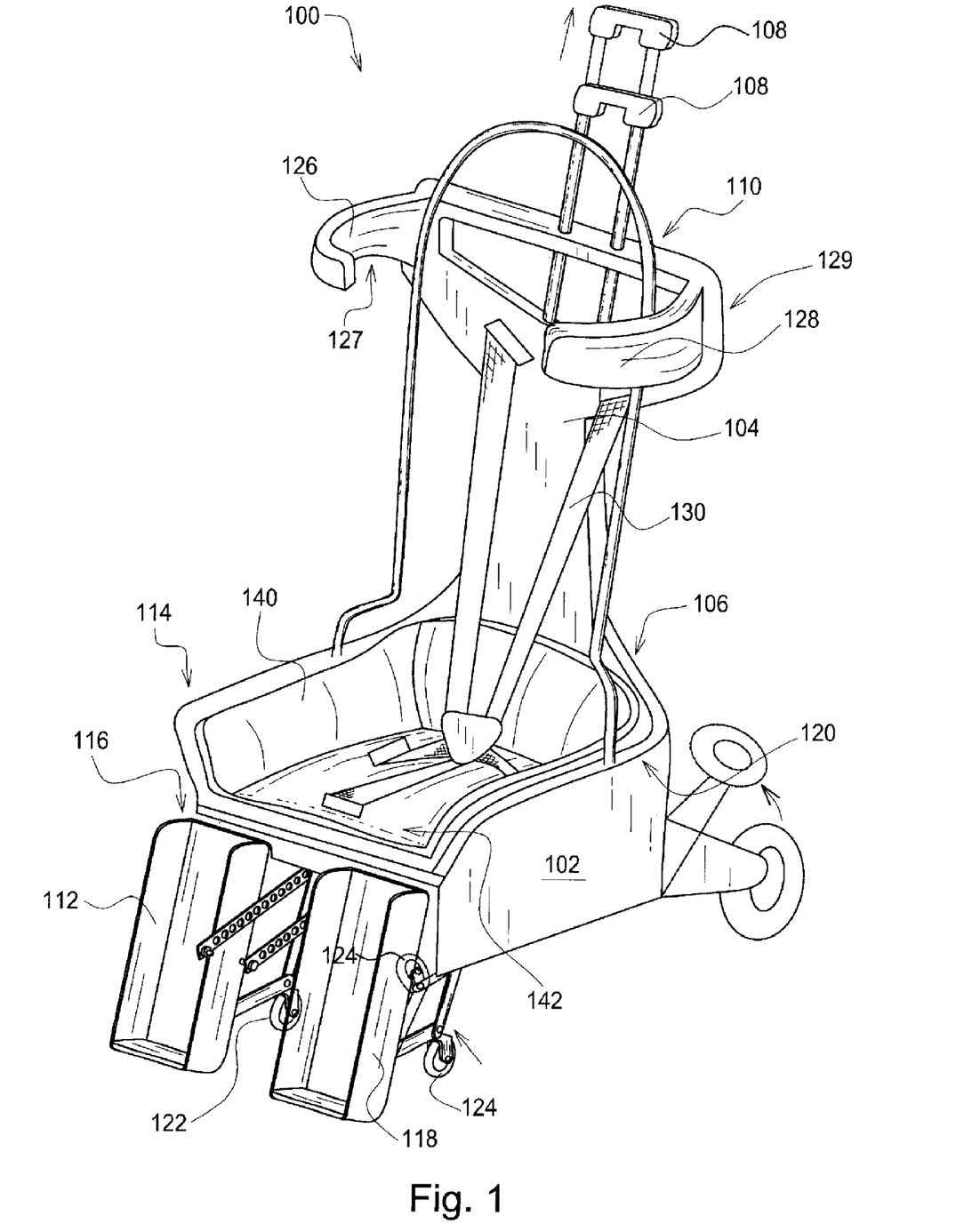
FIG. 1 is a front perspective view of a combination child carrier, according to one embodiment of the invention.

As illustrated by FIG. 1, there is a combination child carrier 100 for carrying a child. In one embodiment of the invention, the combination child carrier 100 may function as a car seat and/or a stroller. As shown, the combination child carrier 100 has a first horizontal seat member 102 and a first vertical support member 104 coupled to a rear portion 106 of the first horizontal seat member 102. In addition, the combination child carrier 100 has an extendable handle member 108 coupled to a top 110 of the first vertical support member 104. For example, the extendable handle may be such as the handle and collapsible tubular members of U.S. Patent Application Publication No. 2004/0173997, by Voll, which is incorporated by reference herein.

Further shown by FIG. 1, the combination child carrier 100 has a front leg support member, or a first front leg support member 112 and a second front leg support member 118, hingedly coupled to a front portion 116 of the first horizontal seat member 102. As shown, the first front leg support member 112 is hingedly coupled to near a first side 114 of a front portion 116 of the first horizontal seat member 102 and extending downwardly therefrom. Likewise, the second front leg support member 118 is hingedly coupled to near a second side 120 of the front portion 116 of the first horizontal seat member 102 and extending downwardly therefrom. Additionally illustrated, the combination child carrier 100 has a first front wheel 122 coupled to the first front leg support member 112, and a second front wheel 124 coupled to the second front leg support member 118. In an alternate embodiment of the invention, the first front leg support member 112 and the second front leg support member 118 may be coupled together to form a single continuous front leg support member.

Moreover, FIG. 1 illustrates a first top support member 126 coupled to a first side 127 of the top 110 of the first vertical support member 104, and a second top support member 128 coupled to a second side 129 of the top 110 of the first vertical support member 104. In one embodiment of the invention, the first top support member 126 and the second top support member 128 provide support and protection for a child's head while being transported by the combination child carrier 100. In another embodiment of the invention, the first top support member 126 and the second top support member 128 provide support for a child's arms when the combination child carrier 100 is used as a backpack carrier.

Also, there is shown a restraint mechanism 130 coupled to the first horizontal seat member 102. In one embodiment of the invention, the restraint mechanism 130 is configured to restrain a child sitting in the combination child carrier 100. For example, one skilled in the art would appreciate that the restraint mechanism 130 may be a seatbelt. In addition, the first horizontal seat member 102 has a pad member 140 disposed over a top 142 of the first horizontal seat member 102. In one embodiment of the invention, the pad member 140 is configured to provide padding for a child sitting on the combination child carrier 100. For example, the pad member 140 may include batting or foam.

Figure 2:
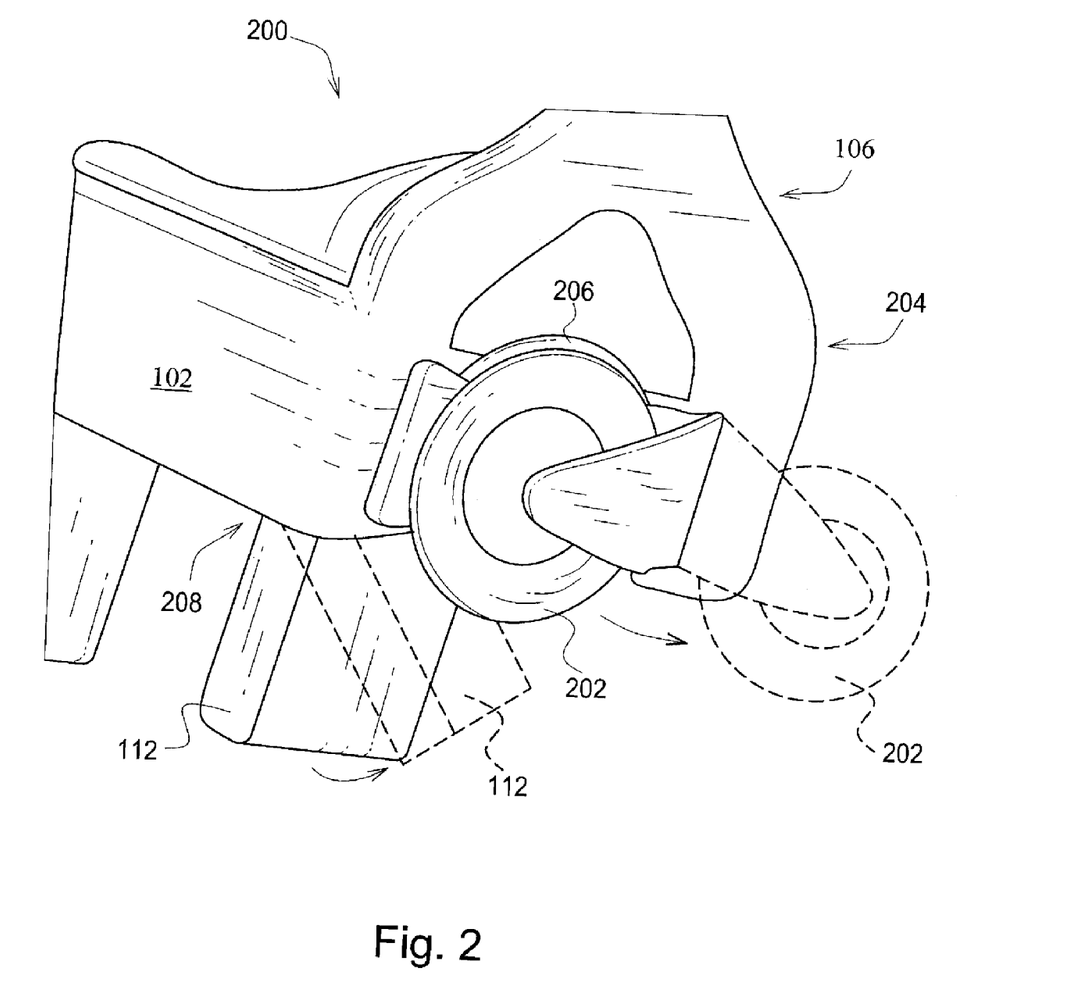
FIG. 2 is a rear perspective view of a combination child carrier, in a first stored mode, according to one embodiment of the invention.
Figure 3:
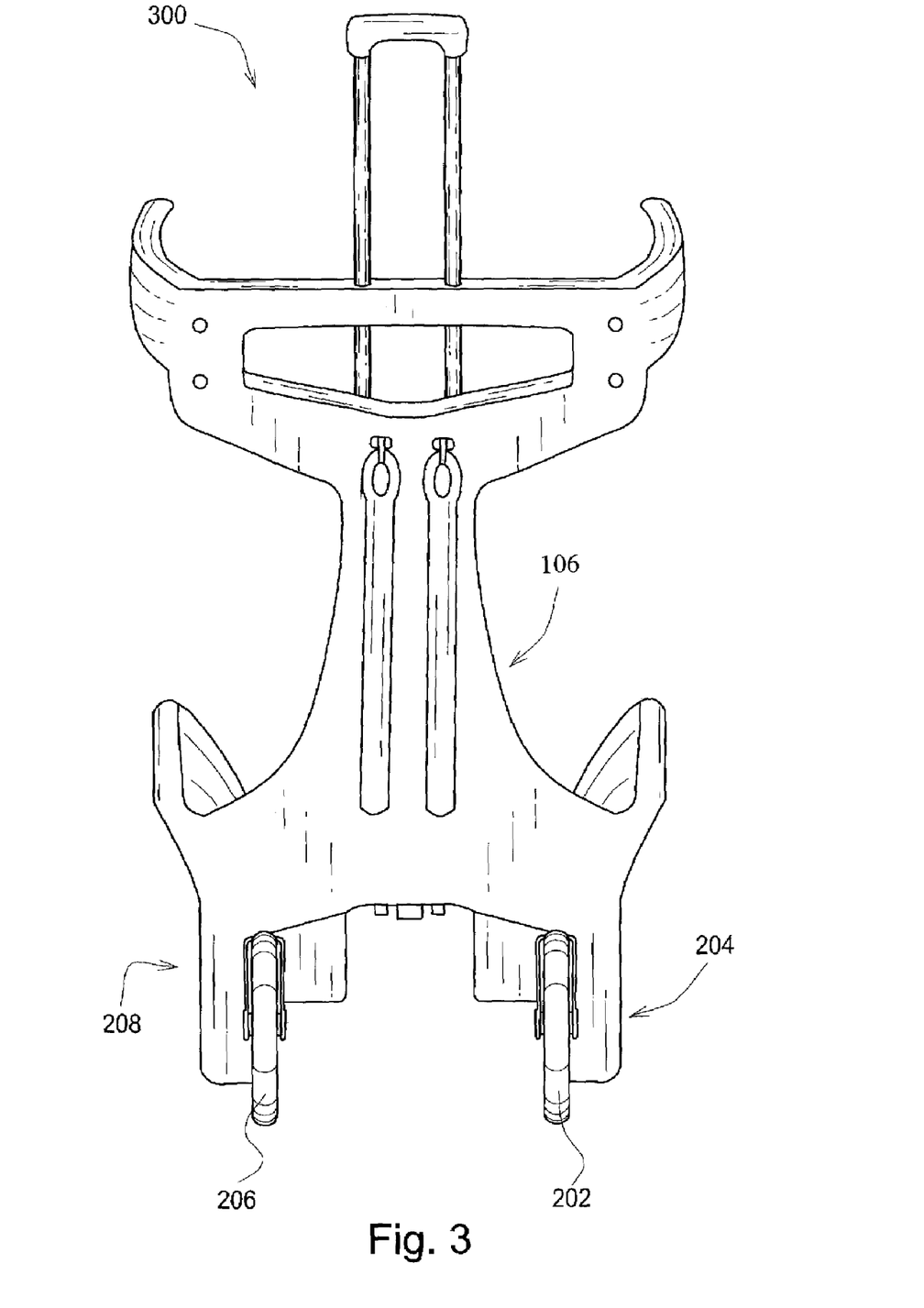
FIG. 3 is a rear elevational view of a combination child carrier, in a first transport mode, according to one embodiment of the invention.

FIGS. 1-3 illustrate a combination child carrier 100 with a plurality of rear wheels 202 and 206 coupled to a rear portion 106 of the first horizontal seat member 102. As shown, the combination child carrier 100 has a first rear wheel 202 rotatably coupled to near a first side 204 of the rear portion 106 of the first horizontal seat member 102, and a second rear wheel 206 rotatably coupled to near a second side 208 of the rear portion 106 of the first horizontal seat member 102. More, in a first stored mode 200, the first rear wheel 202 and the second rear wheel 206 extend above the first horizontal seat member 102 in a substantially horizontal direction, so that the rear wheels 202 and 206 may be stowed for transportation of the combination child carrier 100 in a vehicle, enabling the first horizontal seat member 102 to lie flat against a seat of a vehicle. Further, in a first transport mode 300, the first rear wheel 202 and the second rear wheel 206 extend below the first horizontal seat member 102 in a substantially vertical direction so that the rear wheels 202 and 206 may be used for transportation of the combination child carrier 100 by rolling as a stroller.

In operation of one embodiment of the invention, the combination child carrier 100 is used as a car seat and a stroller. First, rear wheels 202 and 206 are stowed by folding the rear wheels 202 and 206 behind the first vertical support member 104, and front leg support members 112 and 118, with front wheels 122 and 124, are stowed by folding the front leg support members 112 and 118 underneath the first horizontal seat member 102. Next, the combination child carrier 100 is placed in a vehicle so that the combination child carrier 100 lies flat on a seat of the vehicle. Then, the combination child carrier 100 is secured to the vehicle seat with a seatbelt. Next, a child is placed in the combination child carrier 100 and secured with a restraint mechanism 130, such as a seatbelt. After the child is secured, he or she is then transported in the vehicle.

After the child is transported in the vehicle, the combination child carrier 100 is removed from the vehicle. Then, the rear wheels 202 and 206 and the front leg support members 112 and 118, with the front wheels 122 and 124, are extended by rotating them downwardly and outwardly, respectively.

Next, an extendable handle member 108 is extended from a top 110 of the first vertical support member 104. The combination child carrier 100 is then used as a stroller for a child by pushing the combination child carrier 100 with the extendable handle member 108 so that the wheels 122, 124, 202, and 206 roll along the ground.

Figure 4:
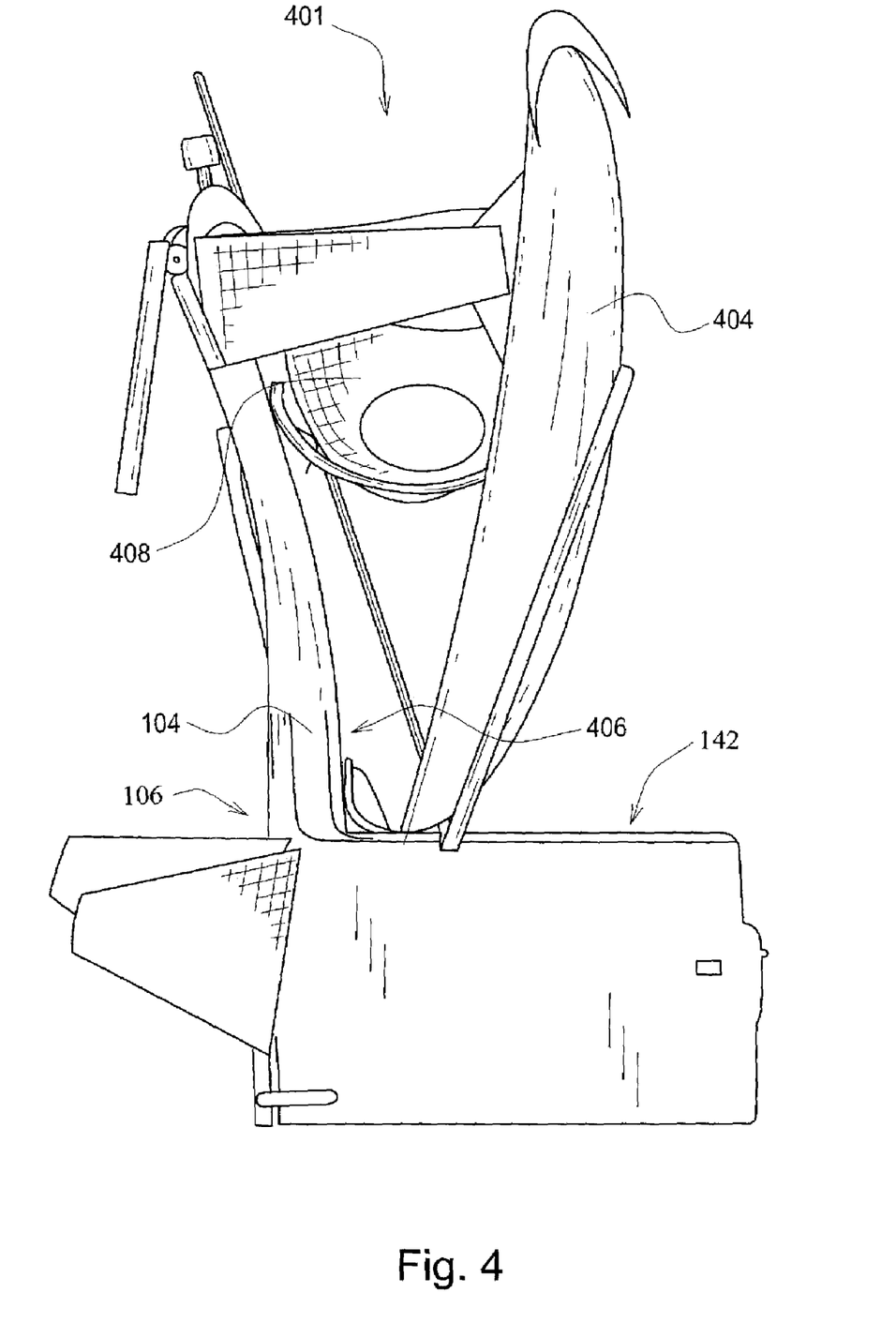
FIG. 4 is a side elevational view of a combination child carrier, in a second transport mode, according to one embodiment of the invention.

More, the combination child carrier 100 may be used as a backpack carrier for transportation of a child. As shown in FIG. 4, the combination child carrier 100 has a second vertical support member 404 hingedly coupled to the rear portion 106 of the first horizontal seat member 102 and extending upwardly therefrom. In addition, the second vertical support member 404 is disposed over a front 406 of the first vertical support member 104. In one embodiment of the invention, the second vertical support member 404 is disposed over and coupled to the front 406 of the first vertical support member 104 by hook and loop.

FIG. 4 also illustrates a second flexible seat member 408 in a second transport mode 401. In the illustrated second transport mode 401, the second flexible seat member 408 is coupled to and disposed between the first vertical support member 104 and the second vertical support member 404. The second flexible seat member 408 is disposed substantially horizontal so that a child may sit on second the flexible seat member 408 when the combination child carrier 100 is being used as a backpack carrier.

As shown, the second flexible seat member 408 is configured to provide a seat for sitting. For example, in one embodiment of the invention, the second flexible seat member 408 may be disposed in a manner similar to a sling, enabling a child to straddle the second flexible seat member. Additionally, the second flexible seat member 408 may be removable. For example, the second flexible seat member 408 may be a seat with leg apertures which is inserted into the combination child carrier 100 between the first vertical support member 104 and the second vertical support member 404 for use of the combination child carrier 100 as a backpack carrier. Furthermore, the second flexible seat member 408 may be secured to the combination child carrier 100 by any securing mechanism appreciated in the art, such as, but not limited to: hooking, tying, snapping, and/or hook and loop.

Figure 5:
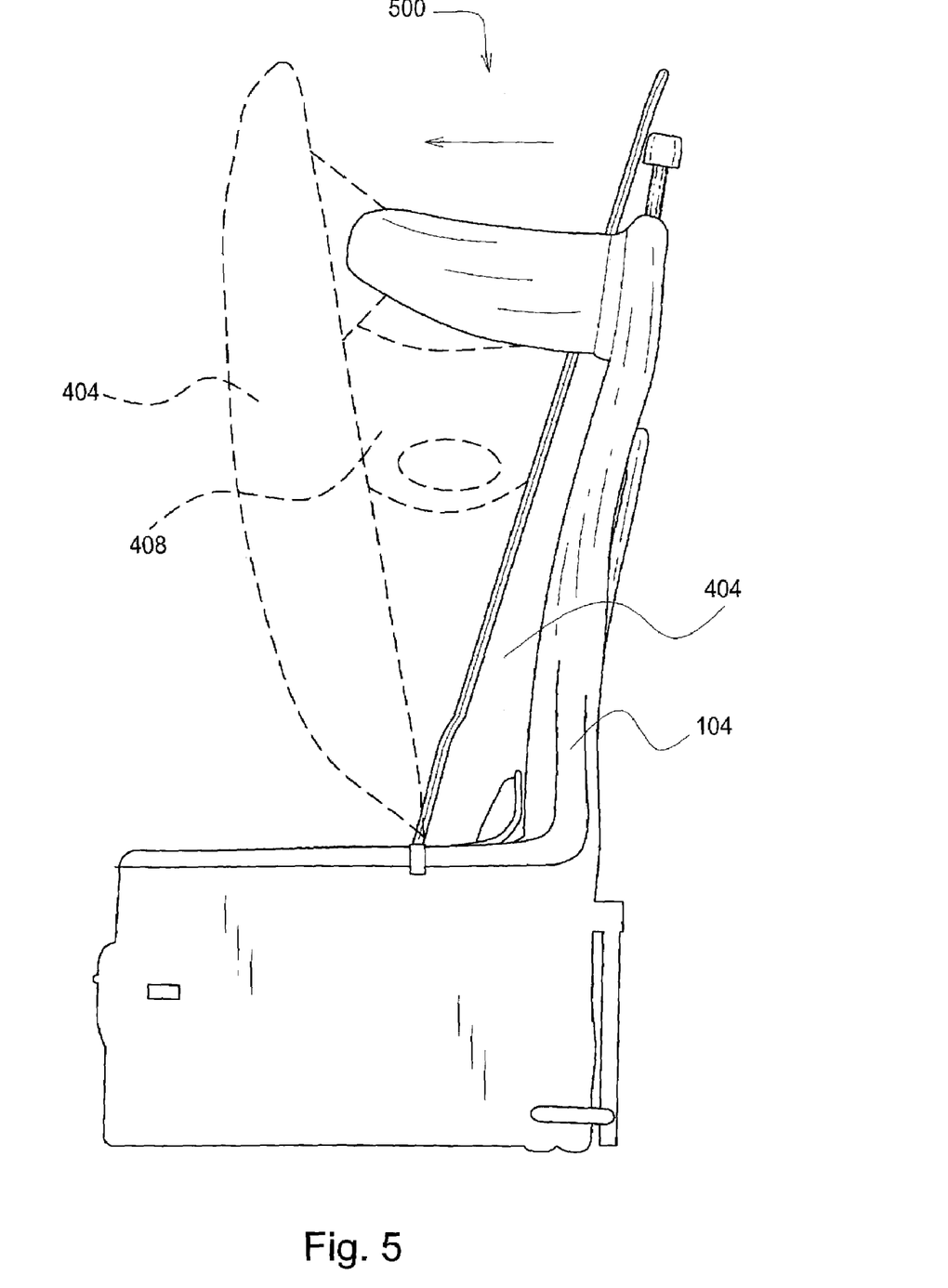
FIG. 5 is a side elevational view of a combination child carrier, in a second stored mode, according to one embodiment of the invention.

Moreover, FIG. 5 illustrates a second stored mode 500 of the combination child carrier 100. In a second store mode 500, the flexible seat member 408 is disposed substantially vertical so that it may be stowed between the first vertical support member 104 and the second vertical support member 404 when the combination child carrier is being used as a car seat and/or a stroller, allowing a child to sit comfortably in the combination child carrier 100. More, in one embodiment of the invention, the second flexible seat member 408 is removably coupled to the first vertical support member 104 and the second vertical support member 404. For example, the second flexible seat member 408 may be removed from the first vertical support member 104 and/or the second vertical support member 404, thereby enabling the first vertical support member 104 to lie flat against the second vertical support member 404.

Figure 6:
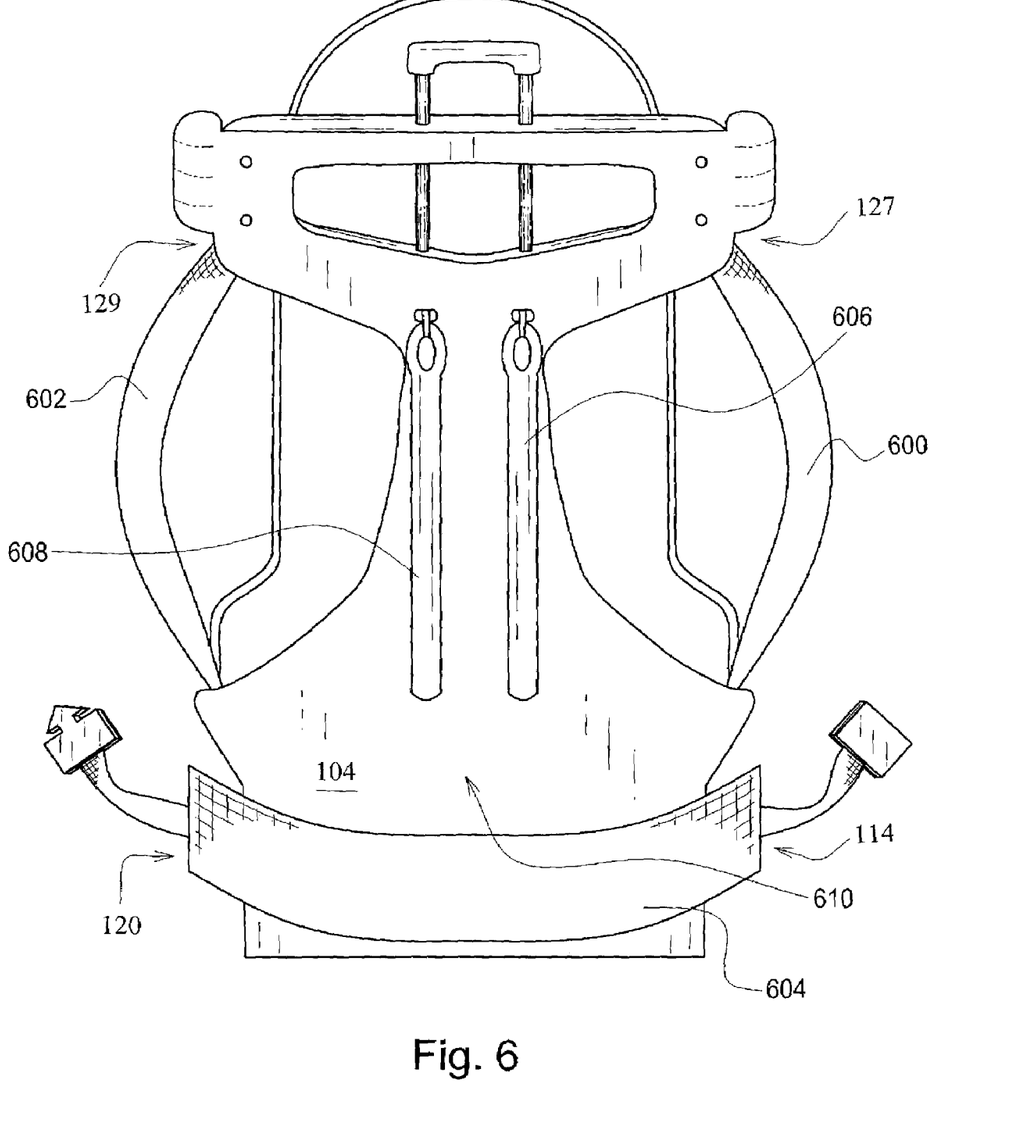
FIG. 6 is a rear elevational view of a combination child carrier, according to one embodiment of the invention.

Additionally, illustrated in FIG. 6, the combination child carrier 100 has a first vertical strap member 600 coupled to the first side 127 of the first vertical support member 104, and a second vertical strap member 602 coupled to the second side 129 of the first vertical support member 104. In one embodiment of the invention, the first vertical strap member 600 and the second vertical strap member 602 are configured to provide a strap for a shoulder. Furthermore, the combination child carrier has a horizontal strap member 604 coupled to the first side 114 and the second side 120 of the first horizontal seat member 102. In one embodiment of the invention, the horizontal strap member 604 is configured to provide a strap for a waist. For example, the horizontal strap member 604 may be a belt. Likewise, the first vertical strap member 600, the second vertical strap member 602, and/or the horizontal strap member 604 may be a harness.

In operation of one embodiment of the invention, the combination child carrier 100 is used as a stroller and a backpack carrier. First, rear wheels 202 and 206 and front leg support members 112 and 118, with front wheels 122 and 124, are extended by rotating them downwardly and outwardly, respectively. Next, an extendable handle member 108 is extended from a top 110 of the first vertical support member 104. The combination child carrier 100 is then used as a stroller for a child by pushing the combination child carrier 100 with the extendable handle member 108 so that the wheels 122, 124, 202, and 206 roll along the ground.

After the combination child carrier 100 is used as a stroller, the rear wheels 202 and 206 are stowed by folding the rear wheels 202 and 206 behind the first vertical support member 104, and the front leg support members 112 and 118, with the front wheels 122 and 124, are stowed by folding the front leg support members 112 and 118 underneath the first horizontal seat member 102. Next, the extendable handle member 108 is stowed by sliding the extendable handle member 108 into the first vertical support member 104. The combination child carrier 100 is then used as a backpack carrier for transporting a child in a backwards position by securing a child to the first horizontal seat member 102 with a restraint mechanism 130, and by securing a first vertical strap member 600 to a first shoulder of a person transporting the child, securing a second vertical strap member 602 to a second shoulder of the person transporting the child, and securing a horizontal strap member 604 to a waist of the person transporting the child, so that the child and the person transporting the child face opposite directions.

Alternatively, the combination child carrier 100 is then used as a backpack carrier for a transporting a child in a forwards position. The combination child carrier 100 is used as a backpack carrier for transporting a child in a forwards position by rotating a second vertical support member 404 to dispose the second flexible seat member 408 substantially horizontal. Then, a child is placed on the second flexible seat member 408 between the first vertical support member 104 and the second vertical support member 404. Next, a first vertical strap member 600 is secured to a first shoulder of a person transporting the child, a second vertical strap member 602 is secured to a second shoulder of the person transporting the child, and a horizontal strap member 604 is secured to a waist of the person transporting the child, so that the child and the person transporting the child face the same direction.

Further, in one embodiment of the invention, the combination child carrier may function as a child seat for a bicycle. FIG. 6 illustrates a first elongated bicycle connection member 606 and a second elongated bicycle connection member 608, each removably coupled to a rear 610 of the first vertical support member 104, and each coupleable to the first horizontal seat member 102. For example, the first elongated bicycle connection member 606 and the second elongated bicycle connection member 608 may be removably coupled to the rear 610 of the first vertical support member 104 by any coupling mechanism appreciated in the art, such as, but not limited to: snap-fit and/or snapping.

Figure 7:
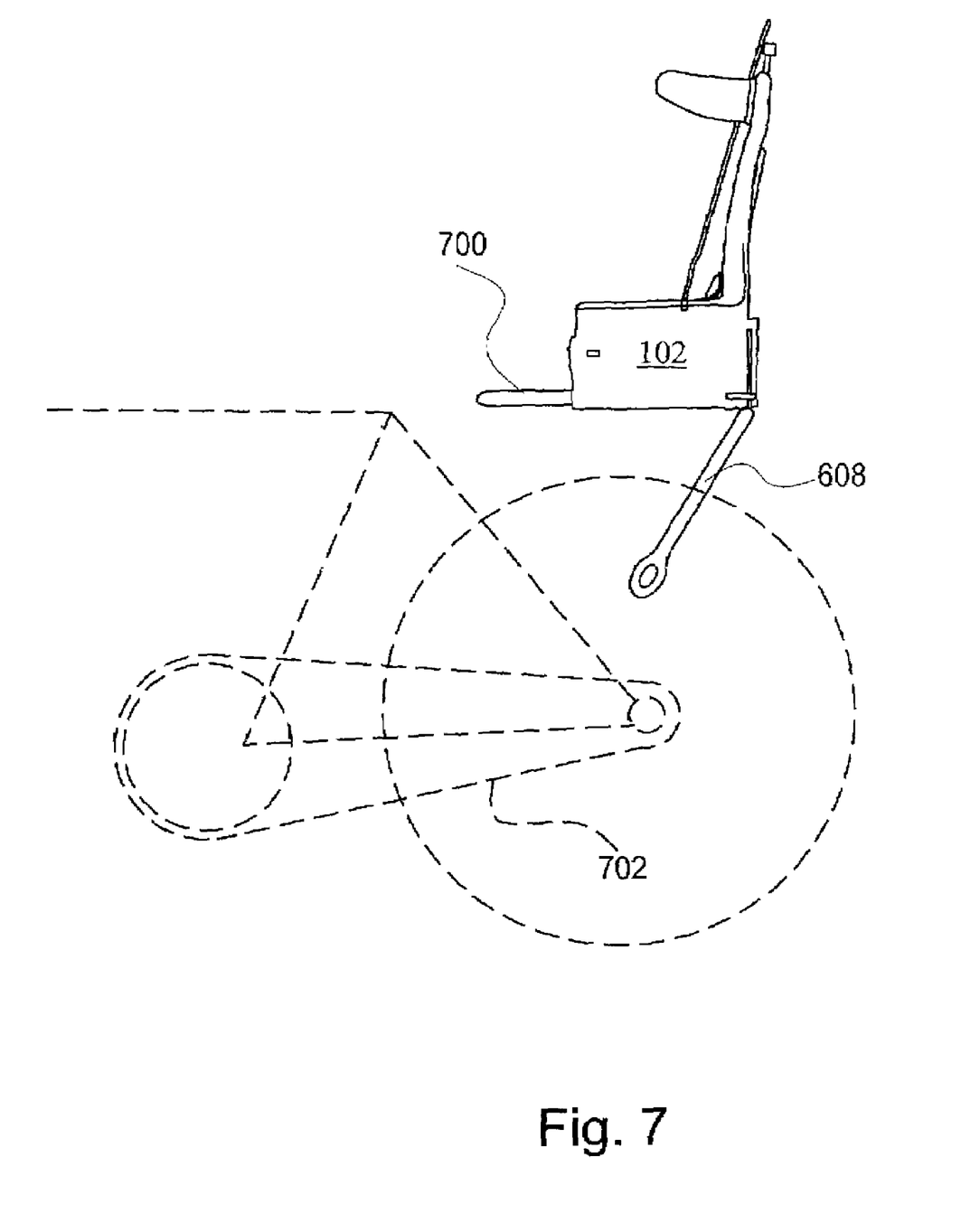
FIG. 7 is a side elevational view of a combination child carrier, according to one embodiment of the invention.
Figure 8:
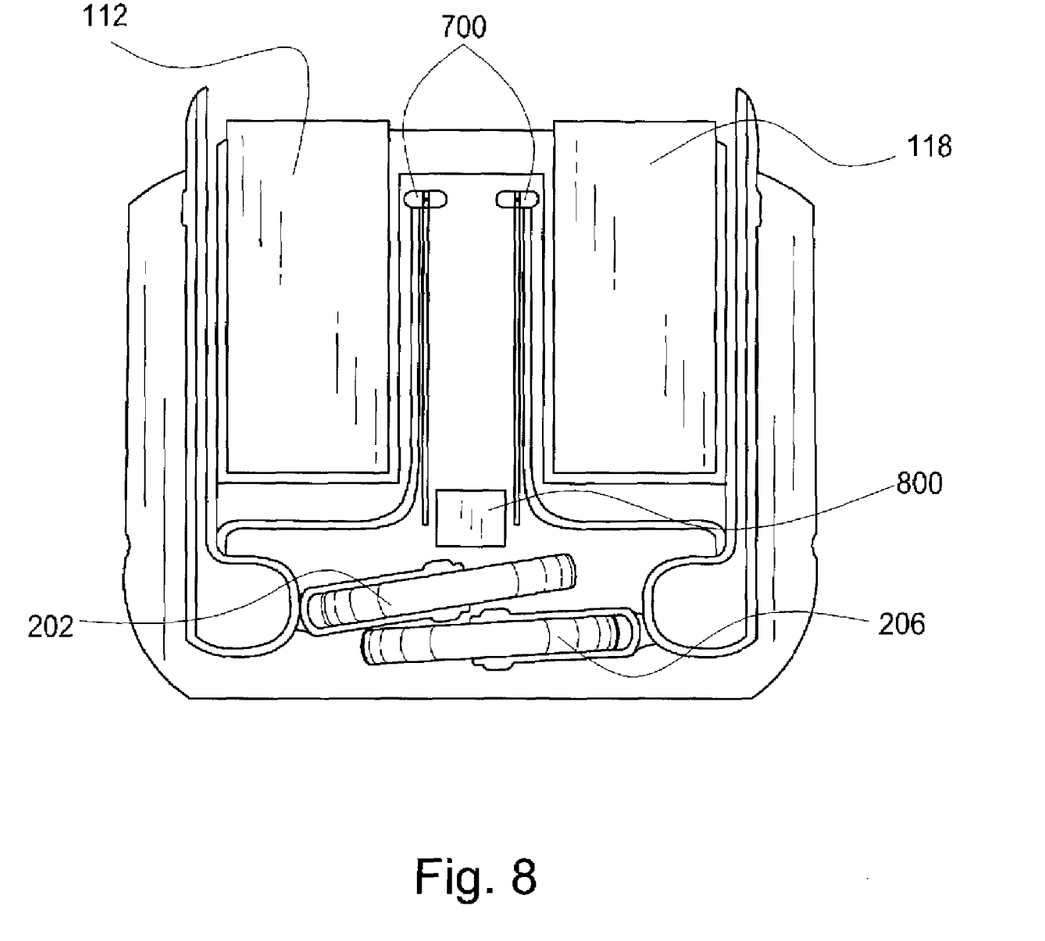
FIG. 8 is a bottom plan view of a combination child carrier, according to one embodiment of the invention.

Further, shown by FIG. 7, the combination child carrier 100 has a front elongated bicycle connection member 700 hingedly coupled to the front portion 116 of the first horizontal seat member 102 between the first front leg support member 112 and the second front leg support member 118. More, the front elongated bicycle connection member 700 may also be slidably coupled to the front portion 116 of the first horizontal seat member 102. In addition, in another embodiment of the invention, the front elongated bicycle connection member 700 is removably coupled to the front portion 116 of the first horizontal seat member 102. Additionally, FIG. 8 illustrates a hardware storage container 800 coupled to a bottom of the first horizontal seat member 102.

In one embodiment of the invention, the first elongated bicycle connection member 606, the second elongated connection member 608, and the front elongated bicycle connection member 700 are configured to connect the combination child carrier 100 to a bicycle 702. For example, the first, second, and front elongated connection members 606, 608, and 700, respectively, may be metal rods which are bolted to bicycles by bolts stored in the hardware storage container 800.

In operation of one embodiment of the invention, the combination child carrier 100 is used as a car seat and a bicycle seat. First, rear wheels 202 and 206 are stowed by folding the rear wheels 202 and 206 behind the first vertical support member 104, and front leg support members 112 and 118, with front wheels 122 and 124, are stowed by folding the front leg support members 112 and 118 underneath the first horizontal seat member 102. Next, the combination child carrier 100 is placed in a vehicle so that the combination child carrier 100 lies flat on a seat of the vehicle. Then, the combination child carrier 100 is secured to the vehicle seat with a seatbelt. Next, a child is placed in the combination child carrier 100 and secured with a restraint mechanism 130, such as a seatbelt. After the child is secured, he or she is then transported in the vehicle.

After the child is transported in the vehicle, the combination child carrier 100 is removed from the vehicle and coupled to a bicycle 702 for use as a bicycle seat. The combination child carrier 100 is coupled to a bicycle 702 by first extending a front elongated bicycle connection member 700 from the front portion 116 of the first horizontal seat member 102 and placing the combination child carrier 100 on a rear portion of the bicycle. Next, the front elongated bicycle connection member 700 is secured to the rear portion of the bicycle. Then, a first elongated bicycle connection member 606 and a second elongated bicycle connection member 608 are removed from a rear 610 of the first vertical support member 104 and secured to a first side and a second side of the first horizontal seat member 102, respectively, by bolting. Next, the first elongated bicycle connection member 606 and the second elongated bicycle connection member 608 are secured to a first side and a second side of the bicycle 702, respectively. After the combination child carrier 100 is secured to the bicycle 702, a child is transported by the bicycle.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, the combination child carrier 100 may include containers which removably coupled to the combination child carrier 100 for storage. For example, storage containers, such as, but not limited to containers for toys, food and/or drink may be removably coupled to the combination child carrier 100. Similarly, a crossbar, tray, and/or table may be removably coupled to the combination child carrier 100.

Also, although the figures illustrated the extendable handle member 108 coupled to a top 110 of the first vertical support member 104, the extendable handle member 108 may be incorporated into the first vertical support member 104. For example, the extendable handle member 108 may be such as the handle and collapsible tubular members of U.S. Patent Application Publication No. 2004/0173997, by Voll, which is incorporated by reference herein. Similarly, the extendable handle member 108 may be removably coupled to a top 110 of the first vertical support member 104.

Also, although the figures illustrate the first rear wheel 202 and the second rear wheel 206 in a first stored mode 200 as extending above the first horizontal seat member 102 in a substantially horizontal direction along the first vertical support member 104, the first rear wheel 202 and the second rear wheel 206 may be stored in a substantially vertical direction along the first vertical support member 104. Alternatively, the first rear wheel 202 and the second rear wheel 206 may be stored underneath the first horizontal seat member 102.

Additionally, although the figures illustrate a pad member 140 disposed over a top 142 of the first horizontal seat member 102, it is envisioned that there may be one or more pad members 140 disposed over various portions of the combination child carrier in order to give the combination child carrier 100 shape, as well as protect and make comfortable a child being transported by the combination child carrier 100. For example, there may be a pad member 140 disposed over the vertical support members 104 and 404, as well as the first and second top support members 126 and 128. For example, the pad member 140 may be such as the padding of the Britzx Boulevard Convertible Car Seat available at http://www.babyage.com/products/e9157_britax_britax_boulevard_convertible_car_seat.htm.

Similarly, it is envisioned that the pad member(s) 140 may be incorporated into the combination child carrier 100. For example, the second vertical support member 404 may be padded.

It is also envisioned that the combination child carrier 100 may be used as a swing. The combination child carrier 100 may be used as a swing by coupling the combination child carrier 100 to a heightened horizontal support. For example, the combination child carrier 100 may be used as a swing by tying a top 110 of the first vertical support member 104 to a tree branch. More, the first vertical strap member 600 and the second vertical strap member 602 may be configured for coupling the combination child carrier 100 to a heightened horizontal support for swinging.

It is expected that there may be numerous variations of the design of this invention. For example, the components of the combination child carrier 100 may have any size and/or shape appreciated in the art. For example, the first horizontal seat member 102 may have protective sideboards which extend from the sides of the first horizontal seat member 102.

Also, the first and second top support members 126 and 128, may be linear and/or curved. Similarly, the first and second top support member 126 and 128 may be incorporated into the top 110 of the first vertical support member 104, so that the top 110 of the first vertical support member 104 is curved.

Likewise, there may be one or more pad members 140 disposed over various portions of the combination child carrier in order to give the combination child carrier 100 shape. For example, there may be a pad member 140 disposed over the vertical support members 104 and 404, as well as the first and second top support members 126 and 128, and may include side panels for extra protection, comfort, and shape.

Similarly, the restraint mechanism 130 may have any design appreciated in the art. For example, the restraint mechanism 130 may be a seat belt. For example, the restraint mechanism may be designed such as the seatbelt of the Touriva 5 Point Car Seat available at http://www.amazon.com/Touriva-Point-Car-Seat-Checkmate/dp/B0007VWCKS.

More, the combination child carrier 100 may have any number of wheels appreciated in the art. For example, the combination child carrier 100 may have one or more rear wheels 202 and 206 coupled to a rear portion 106 of the first horizontal seat member 102. In addition, the combination child carrier 100 may have one or more front wheels 122 and 124 coupled to a front portion 116 of the first horizontal seat member 102.

Finally, it is envisioned that the components of the combination child carrier 100 may be constructed of a variety of materials. For example, the combination child carrier 100 may constructed of materials, such as, but not limited to: metal, plastic, rubber, wood, glass, and/or textiles. More, first horizontal seat member 102 and the first vertical seat member 104 may be composed of a strong, durable, high impact, and lightweight material, such as, but not limited to titanium.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A combination child carrier for carrying a child, comprising:
   a) a first horizontal seat member, configured to provide a seat for sitting, comprises a pad member, disposed over a top of the first horizontal seat member, configured to provide padding for a child sitting on the combination child carrier;
   b) a first vertical support member, coupled to a rear portion the first horizontal seat member and extending upwardly therefrom, configured to provide back support;
   c) an extendable handle member, coupled to a top of the first vertical support member;
   d) a plurality of rear wheels, coupled to a rear portion of the first horizontal seat member;
   e) a front leg support member, hingedly coupled to a front portion of the first horizontal seat member and extending downwardly therefrom;
   f) a first front wheel, rotatably coupled to the front leg support member;
   g) a second front wheel, rotatably coupled to the front leg support member parallel to the first front wheel;
   h) a restraint mechanism, coupled to the first horizontal seat member, configured to restrain a child sitting in the combination child carrier;
   i) a first top support member, coupled to a first side of the top of the first vertical support member, configured to support a head of a child sitting in the combination child carrier;
   j) a second top support member, coupled to a second side of the top of the first vertical support member, configured to support a head of a child sitting in the combination child carrier;

k) a second vertical support member, hingedly coupled to the rear portion of the first horizontal seat member and extending upwardly therefrom, disposed over a front of the first vertical support member, configured to provide back support;

l) a second flexible seat member, coupled to and disposed between the first vertical support member and the second vertical support member, configured to provide a seat for sitting, wherein in a second stored mode the flexible seat member is disposed substantially vertical, and in a second transport mode the flexible seat member is disposed substantially horizontal;

m) a first vertical strap member, coupled to the first side of the first vertical support member, configured to provide a strap for a first shoulder;

n) a second vertical strap member, coupled to the second side of the first vertical support member, configured to provide a strap for a second shoulder; and o) wherein in a first stored mode the rear wheels extend above the first horizontal seat member in a substantially horizontal direction, and in a first transport mode the rear wheels extend below the first horizontal seat member in a substantially vertical direction.

2. The combination child carrier of claim 1, further comprising:

a) a horizontal strap member, coupled to the first side and the second side of the first vertical support member, configured to provide a strap for a waist.

3. The combination child carrier of claim 2, further comprising:

a) a first elongated bicycle connection member, removably coupled to a rear of the first vertical support member, coupleable to the first side of the first horizontal seat member, configured to connect the combination child carrier to a bicycle;

b) a second elongated bicycle connection member, removably coupled to the rear of the first vertical support member, coupleable to the second side of the rear the first horizontal seat member, configured to connect the combination child carrier to a bicycle; and c) a front elongated bicycle connection member, coupled to the front portion of the first horizontal seat member, configured to connect the combination child carrier to a bicycle.

4. The combination child carrier of claim 3, wherein the first elongated bicycle
connection member and the second elongated bicycle connection member are removably coupled to the rear of the first vertical support member by snap-fit; and the first elongated bicycle connection member and the second elongated bicycle connection member are coupleable to the first side of the first horizontal seat member and the second side of the first horizontal seat member, respectively, by bolting.

5. The combination child carrier of claim 4, further comprising:

a) a hardware storage container, coupled to a bottom of the first horizontal seat member, configured to provide storage of hardware for coupling the combination child carrier to a bicycle.

6. The combination child carrier of claim 1, further comprising:

a) a first elongated bicycle connection member, removably coupled to a rear of the first vertical support member, coupleable to the first side of the first horizontal seat member, configured to connect the combination child carrier to a bicycle;

b) a second elongated bicycle connection member, removably coupled to the rear of the first vertical support member, coupleable to the second side of the rear the first horizontal seat member, configured to connect the combination child carrier to a bicycle; and c) a front elongated bicycle connection member, hingedly coupled to the front portion of the first horizontal seat member, configured to connect the combination child carrier to a bicycle.

7. The combination child carrier of claim 6, wherein the first elongated bicycle
connection member and the second elongated bicycle connection member are removably coupled to the rear of the first vertical support member by snapping; and the first elongated bicycle connection member and the second elongated bicycle connection member are coupleable to the first side of the first horizontal seat member and the second side of the first horizontal seat member, respectively, by bolting.

8. The combination child carrier of claim 7, further comprising:

a) a hardware storage container, coupled to a bottom of the first horizontal seat member, configured to provide storage of hardware for coupling the combination child carrier to a bicycle.

9. A combination child carrier for carrying a child, comprising:

a) a first horizontal seat member, configured to provide a seat for sitting;

b) a first vertical support member, coupled to a rear portion the first horizontal seat member and extending upwardly therefrom, configured to provide back support;

c) an extendable handle member, coupled to a top of the first vertical support member;

d) a plurality of rear wheels, coupled to a rear portion of the first horizontal seat member;

e) a front leg support member, hingedly coupled to a front portion of the first horizontal seat member and extending downwardly therefrom;

f) a second vertical support member, hingedly coupled to the rear portion of the first horizontal seat member and extending upwardly therefrom, disposed over a front of the first vertical support member, configured to provide back support; and g) a second flexible seat member, coupled to and disposed between the first vertical support member and the second vertical support member, configured to provide a seat for sitting, wherein in a second stored mode the flexible seat member is disposed substantially vertical, and in a second transport mode the flexible seat member is disposed substantially horizontal.

10. The combination child carrier of claim 9, further comprising:

a) a first vertical strap member, coupled to the first side of the first vertical support member, configured to provide a strap for a first shoulder; and b) a second vertical strap member, coupled to the second side of the first vertical support member, configured to provide a strap for a second shoulder.

11. The combination child carrier of claim 10, further comprising:

a) a horizontal strap member, coupled to the first side and the second side of the first vertical support member, configured to provide a strap for a waist.

12. The combination child carrier of claim 11, wherein in a first stored mode the rear wheels extend above the first horizontal seat member in a substantially horizontal direction, and in a first transport mode the rear wheels extend below the first horizontal seat member in a substantially vertical direction.

13. The combination child carrier of claim 12, further comprising:
   a) a first front wheel, rotatably coupled to the front leg support member; and
   b) a second front wheel, rotatably coupled to the front leg support member parallel to the first front wheel.

14. The combination child carrier of claim 13, further comprising:
   a) a restraint mechanism, coupled to the first horizontal seat member, configured to restrain a child sitting in the combination child carrier.

15. The combination child carrier of claim 14, further comprising:
   a) a first top support member, coupled to a first side of the top of the first vertical support member, configured to support a head of a child sitting in the combination child carrier; and
   b) a second top support member, coupled to a second side of the top of the first vertical support member, configured to support a head of a child sitting in the combination child carrier.

* * * * *